US008254647B1

(12) United States Patent
Nechyba et al.

(10) Patent No.: US 8,254,647 B1
(45) Date of Patent: Aug. 28, 2012

(54) FACIAL IMAGE QUALITY ASSESSMENT

(75) Inventors: Michael Christian Nechyba, Pittsburgh, PA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/448,113

(22) Filed: Apr. 16, 2012

(51) Int. Cl.
*G06K 9/00* (2006.01)

(52) U.S. Cl. ........................................................ 382/118
(58) Field of Classification Search ........... 382/115–118
See application file for complete search history.

(56) References Cited

U.S. PATENT DOCUMENTS

| 7,194,114 | B2 | | 3/2007 | Schneiderman | |
|---|---|---|---|---|---|
| 7,236,615 | B2 | * | 6/2007 | Miller et al. | 382/118 |
| 7,657,086 | B2 | * | 2/2010 | Gu | 382/159 |
| 7,844,085 | B2 | * | 11/2010 | Lu et al. | 382/118 |
| 7,848,548 | B1 | * | 12/2010 | Moon et al. | 382/118 |
| 7,929,771 | B2 | * | 4/2011 | Ko et al. | 382/190 |
| 8,050,465 | B2 | * | 11/2011 | Ianculescu et al. | 382/118 |
| 8,090,158 | B2 | * | 1/2012 | Nonaka et al. | 382/115 |
| 2007/0177794 | A1 | * | 8/2007 | Gu | 382/160 |
| 2008/0080749 | A1 | * | 4/2008 | Nonaka et al. | 382/118 |
| 2008/0109397 | A1 | * | 5/2008 | Sharma et al. | 707/1 |
| 2011/0317872 | A1 | | 12/2011 | Free | |
| 2012/0027304 | A1 | * | 2/2012 | Brown et al. | 382/190 |

* cited by examiner

*Primary Examiner* — Jingge Wu
(74) *Attorney, Agent, or Firm* — Shumaker & Sieffert, P.A.

(57) ABSTRACT

In general, this disclosure describes techniques for assessing image quality of captured facial images. An example method includes capturing an image, generating a facial detection confidence score based in part on a likelihood that a representation of at least a portion of a face is included in the image, generating a facial landmark detection confidence score based at least in part on a likelihood that representations of facial landmarks are accurately identified in the image, and generating a geometric consistency score based at least in part on a difference between a point of intersection between a nose base and a line segment that passes through each eye and a midpoint of the line segment. The method also includes generating an image quality score based in part on a combination of the confidence scores, and the consistency score, and classifying an image quality based on the image quality score.

20 Claims, 7 Drawing Sheets

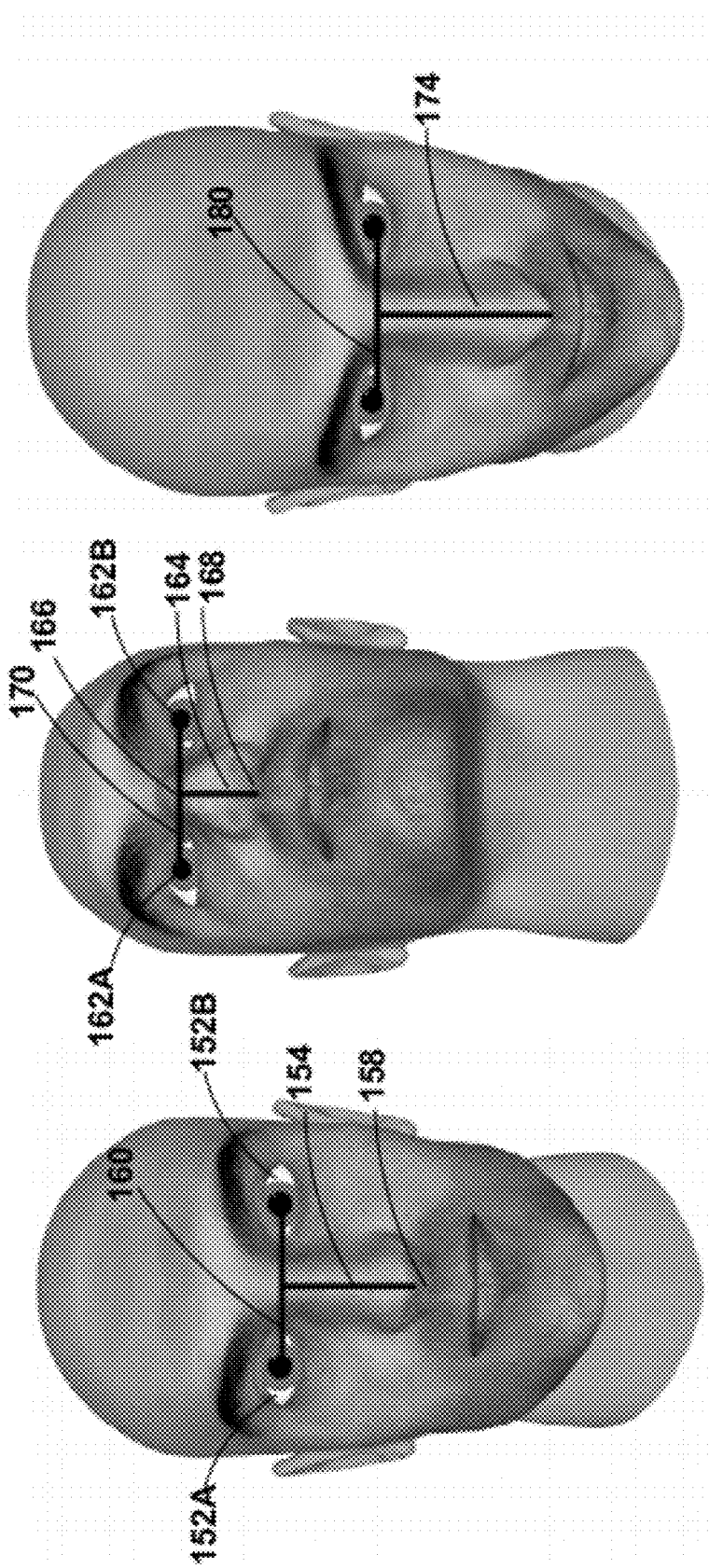

FACIAL IMAGE QUALITY ASSESSMENT

TECHNICAL FIELD

The present disclosure relates to facial image quality assessment.

BACKGROUND

A user may activate or otherwise gain access to functionalities of a mobile computing device by "unlocking" the device. In some instances, a mobile computing device may be configured to permit unlocking based on authentication information provided by the user. Authentication information may take various forms, including alphanumeric passcodes and biometric information. Examples of biometric information include fingerprints, retina scans, and facial images. A mobile computing device may authenticate a facial image input using facial recognition technology.

SUMMARY

In one example, a method includes capturing, by a camera of a mobile computing device, an image, generating, by the mobile computing device, a facial detection confidence score based at least in part on a likelihood that a representation of at least a portion of a face is included in the image, and generating, by the mobile computing device, a facial landmark detection confidence score based at least in part on a likelihood that representations of facial landmarks are accurately identified in the image. The method further includes generating, by the mobile computing device, a geometric consistency score based at least in part on a difference between a point of intersection between a nose base and a line segment that passes through each eye and a midpoint of the line segment in the image, generating, by the mobile computing device, an image quality score based at least in part on a combination of the facial detection confidence score, the facial landmark detection confidence score, and the geometric consistency score, and classifying, by the mobile computing device, a quality of the image based at least in part on the image quality score.

In another example, a computer-readable storage medium includes instructions for causing at least one processor to perform operations. The operations include capturing, with a camera of the mobile computing device, an image, generating a facial detection confidence score based at least in part on a likelihood that a representation of at least a portion of a face is included in the image, and generating a facial landmark detection confidence score based at least in part on a likelihood that representations of facial landmarks are accurately identified in the image. The operations further include generating a geometric consistency score based at least in part on a difference between a point of intersection between a nose base and a line segment that passes through each eye and a midpoint of the line segment in the image, generating an image quality score based at least in part on a combination of the facial detection confidence score, the facial landmark detection confidence score, and the geometric consistency score, and classifying a quality of the image based at least in part on the image quality score.

In another example, a mobile computing device includes at least one camera configured to capture an image, and at least one processor configured to generate a facial detection confidence score based at least in part on a likelihood that a representation of at least a portion of a face is included in the image, and generate a facial landmark detection confidence score based at least in part on a likelihood that representations of facial landmarks are accurately identified in the image. The processor is further configured to generate a geometric consistency score based at least in part on a difference between a point of intersection between a nose base and a line segment that passes through each eye and a midpoint of the line segment in the image, generate an image quality score based at least in part on a combination of the facial detection confidence score, the facial landmark detection confidence score, and the geometric consistency score, and classify a quality of the image based at least in part on the image quality score.

The details of one or more examples are set forth in the accompanying drawings and the description below. Other features, objects, and advantages will be apparent from the description and drawings, and from the claims.

BRIEF DESCRIPTION OF DRAWINGS

FIGS. 5A-5C are conceptual diagrams illustrating three captured images of a user, which may exhibit excessive pitch.

DETAILED DESCRIPTION

In general, this disclosure is directed to techniques for evaluating the quality of the images captured during enrollment and authentication when using facial recognition authentication mechanisms. Conventionally, facial recognition authentication fails in two basic ways: 1) you are the authorized user, but the device fails to authenticate you (false negative) or 2) you are not the authorized user, but the device grants you access as if you are an authorized user (false positive). Either of the authentication failures may result from poor quality enrollment and/or authentication image captures. For example, when a mobile phone captures an image of a person's face, the pose of the face may be outside the range of poses accounted for by internal models of facial landmarks, which may make it difficult to accurately identify the facial landmarks used to align faces when determining whether two different faces match.

Techniques of the disclosure may reduce the frequency of facial recognition authentication failures by identifying image captures of low quality, alerting the user, and refraining from performing facial recognition authentication or completing enrollment until images of satisfactory quality have been captured. In particular, techniques of this disclosure may generate one or more quality scores that a mobile computing device may use to determine whether or not a face is of sufficient quality based on the yaw angle of the face and/or the location of facial landmarks. The mobile computing device receives facial detection information (e.g., a score that corresponds to the likelihood that a face was detected in the image), facial landmark detection information (e.g., a score that corresponds to the likelihood that the landmarks are accurately located), and a geometric consistency score for three points—the center of each eye and the base of the nose. In general, faces exhibiting larger yaw will result in lower face detection scores, facial landmark detection scores, and geometric consistency scores. Based on the three signals, the mobile computing device outputs a quality score. The mobile computing device may reject captured images that have a quality score lower than a configurable threshold value.

Figure 1:
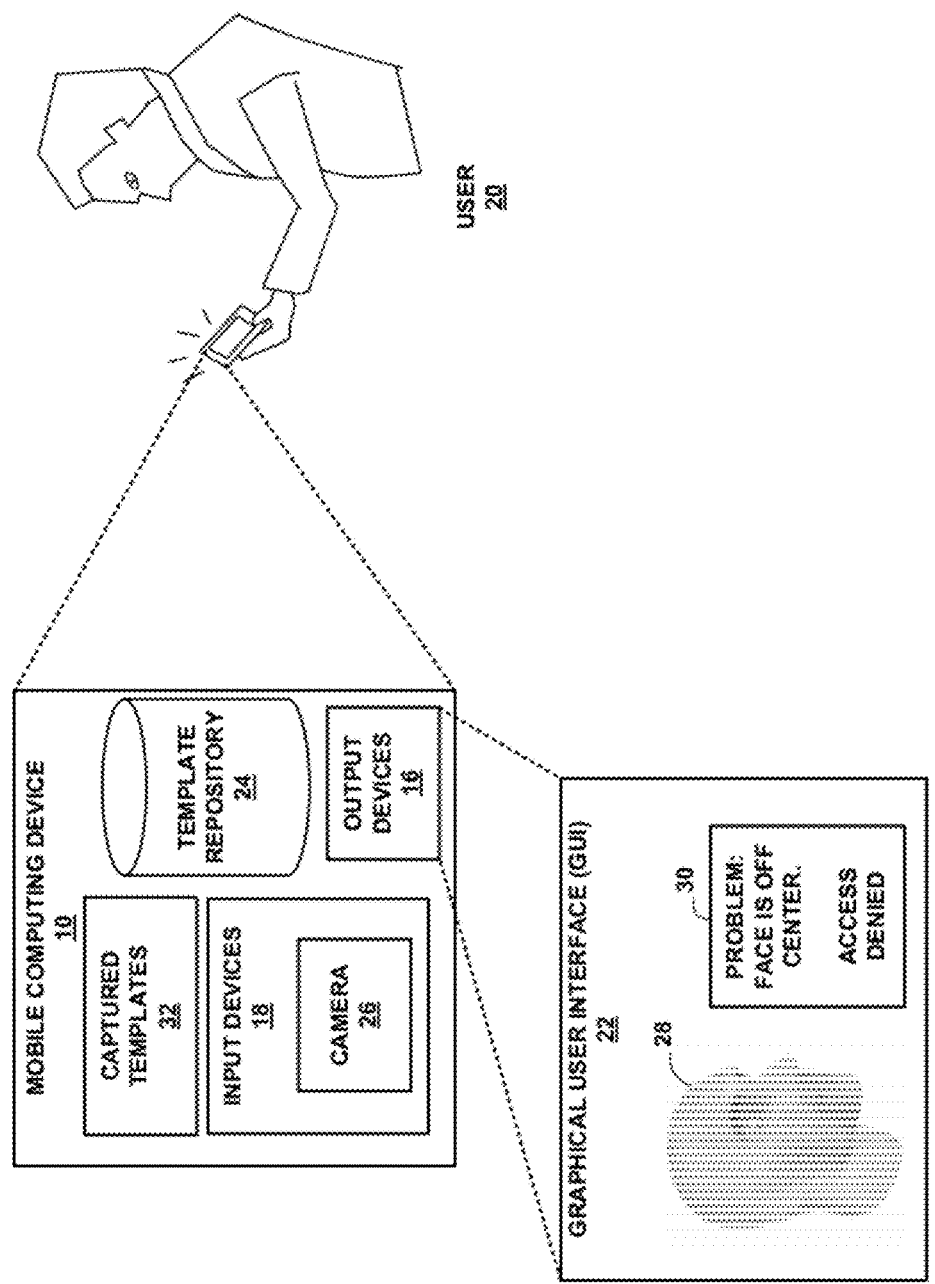
FIG. 1 is a conceptual diagram illustrating an example computing device that may assess the quality of a captured facial image, in accordance with one or more aspects of the present disclosure.

FIG. 1 is a conceptual diagram illustrating an example computing device that may assess the quality of a captured facial image, in accordance with one or more aspects of the present disclosure. In the example of FIG. 1, a user holds a mobile computing device 10 that may perform facial recognition based on one or more images captured by mobile computing device 10. Mobile computing device 10 may include, be, or be part of one or more of a variety of types of devices, such as a mobile phone (including so-called "smartphones"), tablet computer, netbook, laptop, desktop, personal digital assistant ("PDA"), automobile, set-top box, television, and/or watch, among others.

In the example of FIG. 1, mobile computing device 10 may include one or more input devices 18, at least one of which may include a camera 26. Camera 26 may be part of or coupled to a front-facing camera of mobile computing device 10. In other examples, camera 26 may be part of or coupled to a rear-facing camera of mobile computing device 10. One or both of the front-facing and rear-facing cameras may be capable of capturing still images, video, or both.

Mobile computing device 10 may further include a template repository 24. In some examples, template repository 24 may comprise a logical and/or physical location (e.g. a logical location that references a particular physical location), such as one or more of storage devices 56 of FIG. 2. In some examples, template repository 24 may comprise a directory or file of a file system, a database, or a sector or block of a hard disk drive, solid state drive, or flash memory. In an example, template repository 24 may also reside at least partially in a memory of storage devices 56 (e.g. if the images of template repository 24 are cached for later write through to one or more of storage device 56).

Mobile computing device 10 may further include output devices 16. At least one of output devices 16 may display a graphical user interface 22 (GUI 22). In various examples, mobile computing device 10 may cause one or more of output devices 16 to update GUI 22 to include different user interface controls, text, images, or other graphical contents. Displaying or updating GUI 22 may generally refer to the process of causing one or more of output devices 16 to change the contents of GUI 22, which may be displayed to the user.

In the example of FIG. 1, a user 20 may not currently be authenticated with mobile computing device 10. However, user 20 may wish to authenticate with mobile computing device 10. User 20 may attempt to authenticate with mobile computing device 10 using facial recognition. GUI 22 may display graphical information related to authenticating a user to mobile computing device 10 using facial recognition according to techniques of this disclosure. In the example of FIG. 1, user 20 of mobile computing device 10 may attempt to authenticate with mobile computing device 10 in order to gain access to some or all of the resources of mobile computing device 10.

In general and in the example of FIG. 1, facial recognition may occur in two phases: an enrollment phase and an authentication phase. During the enrollment phase, user 20 uses camera 26 of mobile computing device 10 to capture captured image 28. Mobile computing device may generate one or more captured templates 32 based on the captured image 28. A template may comprise a processed version of an image, and/or features of an image. A template may further comprise model parameters that may be used in conjunction with facial feature recognition algorithms, as well as intrinsic characteristics of what a person looks like. Mobile computing device 10 may store the captured templates 32 in template repository 24 for later use in the authentication phase. More specifically, mobile computing device 10 may compare the templates stored in template repository 24 with the captured templates 32 of a user that is trying to authenticate (referred to as an "authentication user") with mobile computing device 10. The templates stored in template repository 24 may be referred to as "reference templates." The process of obtaining and storing one or more template images is referred to as "enrollment."

The authentication phase of facial recognition on a mobile device occurs when user 20 attempts to authenticate him or herself with mobile computing device 10 in order to gain access to resources of mobile computing device 10. During the authentication phase, mobile computing device 10 may compare captured templates 32 of a user 20, with one or more of the reference templates of template repository 24.

More specifically, mobile computing device 10 may compare the features of captured templates 32 against the reference template features. Each template may correspond to one or more features of a user's face. The template may generally correspond to a statistical model of the one or more features. As an example, the pixels that form a portion of an image illustrating a person's eye, which is one example of a feature, may correspond to a particular statistical distribution or relationship of the pixels in the area comprising a particular feature. Mobile computing device 10 may compare the one or more features represented by a captured template with a reference template to determine if the two are similar.

The statistical distributions of a feature may be based on the distribution of coefficients resulting from one or more discrete wavelet transforms (DWTs). Wavelet transforms may transform the pixel values of an image into wavelet coefficients. Mobile computing device 10 may compare corresponding features from of the captured templates 32 and one or more templates of template repository 24 to produce a likelihood that the features match based on the similarity of the templates. If the likelihood exceeds a threshold, computing device 10 may determine that captured templates 32 match the features of one or more of the templates of template repository 24. The templates of template repository 24 may include templates that attempt to model a number of different poses and conditions. As some examples, the templates may attempt to model different lighting conditions, different facial expressions, and faces of users with and without glasses.

If mobile computing device 10 determines that captured templates 32 match the features of one or more of the reference templates, mobile computing device 10 may grant user 20 access to the resources of mobile computing device 10. Mobile computing device 10 may determine whether captured templates 32 match the templates of template repository 24 based on whether a combination of scores comparing the two templates exceeds a threshold. In some examples, the if mobile computing device 10 determines that the features of captured templates 32 do not match a sufficient number of the templates of template repository 24, mobile computing device 10 may deny user 20 access to the resources of mobile computing device 10. In some implementations, denying user 20 access to the resources can include providing one or more alternative authentication options, such as password or gesture entry, voice recognition, or secure element, among others, and/or providing another opportunity to authenticate using facial recognition.

In both the enrollment and authentication phases, mobile computing device 10 may determine that captured image 28 is of low quality, which may make captured image 28 and captured templates 32 unsuitable for use in facial recognition. In some cases, low quality images may be used despite the low quality of the images, which may result in an authorized user being denied access to the resources of the mobile device in some or all instances, or may result in an unauthorized user being granted access to the resources of the mobile device in some or all instances, both of which are undesirable results. In some examples, a computing device 10 may display a warning to user 20 using GUI 22 at the enrollment stage indicating that the captured image 28 is of low quality. The user may dismiss the warning or the user may elect to proceed despite low quality. This disclosure is generally directed toward techniques for determining whether a captured image is suitable for use in facial recognition, which may reduce the likelihood that poor quality images are used during the enrollment or authentication process when performing facial recognition.

In the example of FIG. 1, user 20 may attempt to authenticate via facial recognition with mobile computing device 10. In the example of FIG. 1, user 20 may be engaged in either the enrollment or authentication phases. As part of the facial recognition process, user 20 may use a facial recognition (enrollment or unlock) interface to cause computing device 10 to acquire captured image 28 of user 20 using the camera 26. In the example of FIG. 1, computing device may determine that captured image 28 is of low quality, and therefore unsuitable for use in facial recognition. Computing device 10 may determine that the captured image 28 is of low quality based on one or more of a geometric consistency score, a facial landmark detection confidence score, and a facial detection confidence score. Each of the three scores is discussed in further detail below.

Based on the determination that a captured image 28 is of low quality, mobile computing device 10 may, for example, alert user 20 by updating GUI 22 with an indication that the captured image is of low quality via a message box control 30. Computing device 10 may determine that captured image 28 is of low quality based on a low geometric consistency score value that computing device 10 determines. Message box control 30 may include suggestions on how to improve the quality of future images captured by camera 26 of mobile computing device 10 via GUI 22 based on low confidence scores and/or failures to match features of the templates. As an example, a low facial detection confidence score may indicate that the lighting is bad, and computing device 10 may update GUI 22 to suggest taking a picture in better lighting conditions. As another example, a low geometric consistency score may indicate significant yaw, and mobile computing device 10 may update GUI 22 to suggest that user 20 center his or her face with respect to the camera 26. In some examples, computing device 10 may attempt to capture an additional image some pre-determined number of times before alerting the user that captured templates 32 is of low quality.

Captured image 28 may be of low quality for facial recognition due to a number of reasons. As some examples, captured image 28 may suffer from alignment issues, such as pitch, yaw, and/or roll. Computing device 10 may attempt to detect pitch, yaw, and/or roll, and may attempt to fix other issues, such as poor lighting or centering. In the example of FIG. 1, the face of user 20 may not be aligned straight on with camera 26. Rather, the face of user 20 may be rotated. That is, instead of being aligned with camera 26, the face of user 20 may be rotated at some angle around one or more of three different axes. The movement around each of these axes may be referred to as pitch, roll, and yaw. Each of pitch, roll, and yaw, are further described below with regard to FIG. 3.

Mobile computing devices, which may include mobile computing device 10, may especially suffer from capturing images that have pitch, roll and/or yaw issues. Captured images may suffer from these issues because mobile computing devices are hand-held, and users often hold mobile computing devices below face level (e.g., at chest or waist level). Also, because mobile computing devices are small and lightweight, users may easily and inadvertently rotate the devices. As an example, user 20 may hold mobile computing device 10 below the level of his or her face. Thus, when capturing an image of a face of a user, camera 26 may acquire a captured image of user 20 with his or her head tilted upward and away from camera 26. As stated above, when the head of user 20 is not properly aligned, problems may occur during the enrollment and/or authentication phases of facial recognition performed by mobile computing device 10.

Based on the captured image 28, computing device 10 may produce captured templates 32. To determine the quality of the captured image 28, mobile computing device 10 may compute one or more confidence scores and/or determine one or more other indications of the quality of the captured image 28. In some examples, the values of the confidence scores may be based on a confidence that mobile computing device 10 has successfully recognized various features of a human face in the captured templates 32. If mobile computing device 10 recognizes features of a face, a confidence score may be higher. If mobile computing device 10 does not recognize facial features of a person from captured templates 32, a confidence score may be lower. As described above, various features of a human face may be modeled using templates. The templates may comprise statistical models of the various features of the human face. Based on how closely the statistical properties of captured templates 32 match the features of the templates of template repository 24, computing device 10 may produce higher confidence scores. In some examples, computing device 10 may determine a template for an entire human face, and this template may be used by computing device 10 to produce the facial detection confidence score. Computing device 10 may also determine templates for two eyes and the base of a nose of user 20. Computing device 10 may use these templates to determine the facial landmark detection confidence score. Based on the distance between the eyes and the base of nose, computing device 10 may determine the geometric consistency score. Further details about the geometric consistency score are described below.

As part of determining the quality of the captured image 28, mobile computing device 10 may further determine whether captured templates 32 exhibits pitch, yaw, and/or roll. The process of determining whether a captured templates 32 exhibits pitch, yaw, and/or roll is described in further detail below. Mobile computing device 10 may further alert user 20 of the determined rotational issues that caused the captured templates 32 to be determined as having low quality. As an example, mobile computing device 10 may also update GUI 22 to instruct user 20 to look directly at the camera in a case where the geometric alignment determined as part of the geometric consistency score indicates that the head of user 20 is rotated to the left or the right. In another example, mobile computing device 10 may alert user 20 that his or her head is pitched too far up or down with GUI 22 to in a case where a geometric consistency, facial landmark consistency, and/or facial detection scores indicate that the head of user 20 is pitched up or down. The mobile device may further attempt to acquire one or more additional images after user 20 has been informed of the quality issues affecting the previously captured templates 32.

As stated above, mobile computing device 10 may calculate confidence scores such that the scores may indicate a likelihood that various features have been found or that various parameters are within an acceptable range. In some examples, mobile computing device 10 may calculate a facial detection confidence score, a facial landmark detection confidence score, and a geometric consistency score. The face detection confidence score may indicate a value that a face of a user has been detected. The facial landmark confidence score may indicate a confidence that various facial landmarks of a user have been detected. In some examples, the facial features may comprise a base of the nose and each eye of a user. The geometric consistency score may calculate a confidence value based on measurements of the distances between facial landmarks, such as the centers of a user's eyes and the base of the user's nose. The geometric consistency score may be based on a likelihood that the distances between the landmarks are consistent with those of a human face. Each of the face detection confidence score, facial landmark confidence score, and the geometric consistency scores may indicate whether or not captured image 28 is of high or low quality. The geometric consistency and facial landmark detection scores are further described below with respect to FIG. 4.

Based on the one or more confidence scores that mobile computing device 10 determines, mobile computing device 10 may determine an image quality score based at least in part on a combination of the facial detection confidence score, the facial landmark detection confidence score and the geometric consistency score. Mobile computing device 10 may also consider other signals when determining the image quality score. Based in part on the image quality score, mobile computing device 10 may classify a quality of captured image 28. As an example, mobile computing device 10 may classify captured image 28 as good quality or poor quality based on the image quality score.

Mobile computing device 10 may take a variety of actions responsive to determining a quality of captured image 28. As an example, whether mobile computing device 10 determines that captured image 28 is of high or low quality, mobile computing device 10 may output captured image 28 via GUI 22. In some examples, mobile computing device 10 may reject an image classified as a poor quality image and alert that user 20 via message box 30 that captured image 28 has been rejected. Rejecting an image refers to discarding the poor quality image and not performing a comparison of captured templates 32 with the templates of template repository 24. Mobile computing device 10 may further output recommended actions to increase the quality of future captured images. Some suggestions may include telling the user to hold mobile computing device 10 in alignment with the face of user 20, and instructing user 20 not to tilt his or her head to one side or the other or up and down.

In an example, mobile computing device 10 may also output indications of the locations of each eye and the nose base of the template. More specifically, mobile computing device 10 may output a graphical indication, such as a circle, dot, square, or any other indication that illustrates to user 20 where mobile computing device 10 detected that the eyes and nose of user 20 are located in captured image 28. The graphical indications may be overlaid atop of captured image 28, so as to give user 20 a better of idea of why captured image 28 was rejected. In various examples where captured image 28 is rejected, computing device may update GUI 22 to include alternative authentication methods, such as a password screen, or a pattern authentication screen in which user 20 draws a pattern or shape on the screen to grant user 20 access to the resources of mobile computing device 10.

Figure 2:
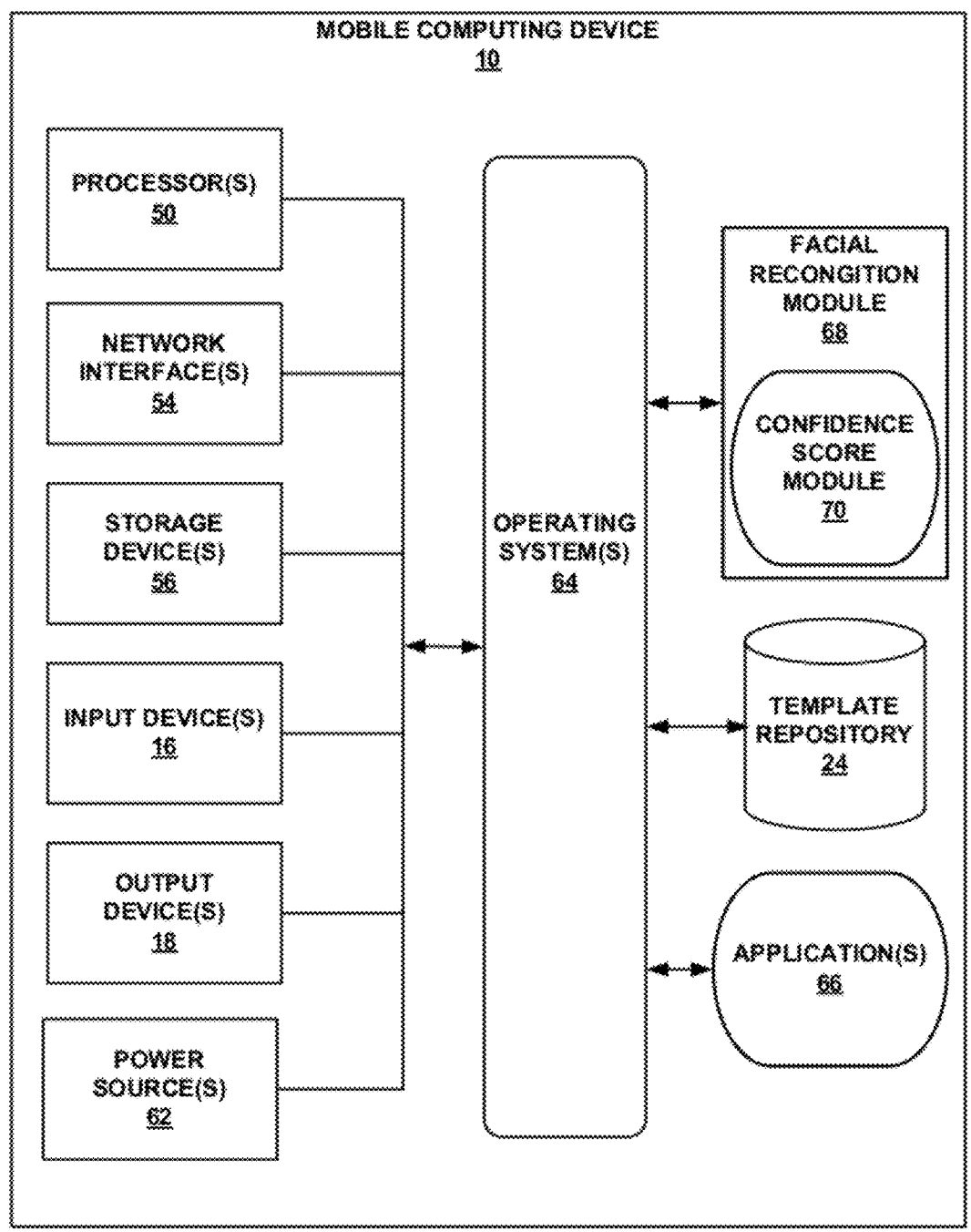
FIG. 2 is a block diagram illustrating details of an example computing device, in accordance with one or more aspects of the present disclosure.
Figure 3A:
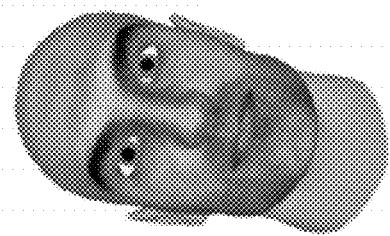
FIGS. 3A-3I are conceptual diagrams illustrating a number of images of a user that may exhibit, pitch, roll, and yaw.
Figure 3B:
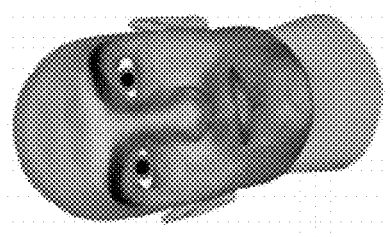
Figure 3C:
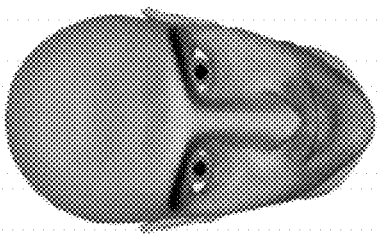
Figure 3D:
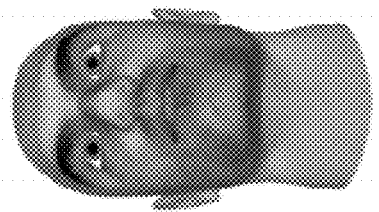
Figure 3E:
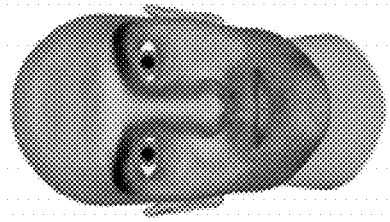
Figure 3F:
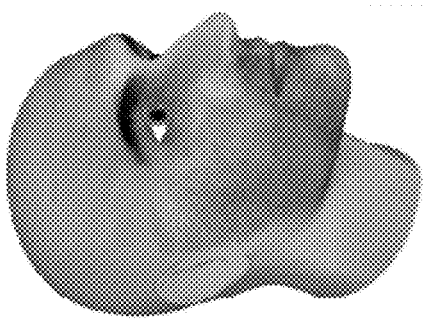
Figure 3G:
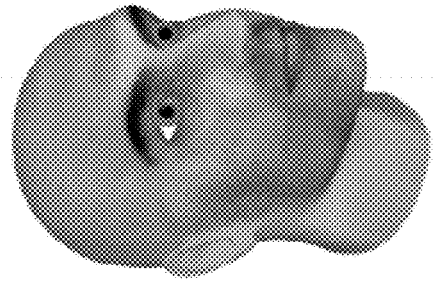
Figure 3H:
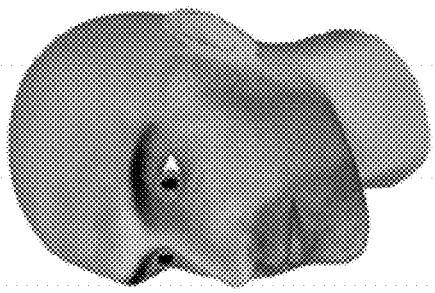
Figure 3I:
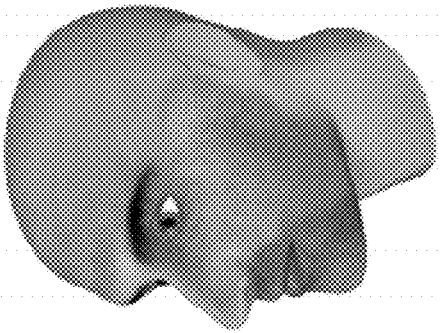

FIG. 2 is a block diagram illustrating details of an example computing device, in accordance with one or more aspects of the present disclosure. FIG. 2 illustrates only one particular example of mobile computing device 10, and many other example embodiments of mobile computing device 10 may be used in other instances.

As shown in the specific example of FIG. 2, mobile computing device 10 includes one or more processors 50, one or more network interfaces 54, one or more storage devices 56, one or more input devices 16, one or more output devices 18, a template repository 24, and one or more power sources 62. Mobile computing device 10 also includes one or more operating systems 64 that are executable by mobile computing device 10.

Facial recognition module 68 may include confidence score module 70. Confidence score module 70 may analyze the values produced by facial recognition module 68, such as a value indicating a likelihood that a user's face has been detected, the likelihood that a user's face, and facial features have been detected, and the distance between the facial features of the user in order to determine one or more confidence scores and an image quality score.

Mobile computing device 10 may further include one or more applications 66, which the one or more processors 50 may execute. Each of components 16, 18, 24, 50, 54, 56, 62, 64, 66, 68, 70, and 12 may be interconnected (physically, communicatively, and/or operatively) for inter-component communications. One or more processors 50, in one example, may be configured to implement functionality and/or process instructions for execution within mobile computing device 10. For example, one or more processors 50 may be capable of processing instructions stored on storage devices 56.

One or more storage devices 56 may be configured to store information within mobile computing device 10 during operation. For instance, storage device 56 may include a memory. Storage device 56, in some examples, is described as a computer-readable storage medium. In some examples, storage device 56 may be a temporary memory, meaning that a primary purpose of storage device 56 is not long-term storage. Storage device 56 may also, in some examples, be described as a volatile memory, meaning that storage device 56 does not maintain stored contents when the computer is turned off. Examples of volatile memories include random access memories (RAM), dynamic random access memories (DRAM), static random access memories (SRAM), and other forms of volatile memories known in the art. In some examples, storage device 56 may be used to store program instructions for execution by processors 50. Storage device 56 may be used by software or applications running on mobile computing device 10 (e.g., one or more of applications 66) to temporarily store information during program execution. In some examples, facial recognition module 68 may comprise one or more of applications 66. In some examples, a user may download and install the application, for example from an app store. Once installed, the application may execute in order to authenticate a user via facial recognition in order to allow or deny user 20 access to the resources of mobile computing device 10.

Mobile computing device 10, in some examples, also includes one or more network interfaces 54. Mobile computing device 10, in one example, utilizes one or more network interfaces 54 to communicate with external devices via one or more networks, such as one or more wireless networks. Network interface 54 may be a network interface card, such as an Ethernet card, an optical transceiver, a radio frequency transceiver, or any other type of device that can send and receive information. Other examples of such network interfaces 54 may include Bluetooth®, 3G, 4G, and WiFi® radios in mobile computing devices as well as USB. In some examples, mobile computing device 10 utilizes network interface 54 to wirelessly communicate with an external device such as a server, a mobile phone, or other networked computing device.

Mobile computing device 10, in one example, also includes one or more input devices 16. Input devices 16, in some examples, may be configured to receive input from a user through tactile, audio, or video input. In the example of FIG. 1, input devices 16 may include at least one camera, such as camera 26. Camera 26 may be a front-facing or rear-facing camera. Responsive to user input or application input, camera 26 may capture digital images, which may be stored on storage devices 56. In some examples, camera 26 may be used to capture images, which mobile computing device 10 may use to generate templates, such as captured templates 32, as part of performing facial recognition. One or more input devices 16 may also be output devices. Examples of input device 16 include a presence-sensitive screen, a mouse, a keyboard, a voice responsive system, video camera, microphone, or any other type of device for detecting a command from a user. In some examples, a presence-sensitive screen includes a touch-sensitive screen.

A presence-sensitive screen is a screen, such as a liquid crystal display (LCD), plasma screen, cathode ray tube (CRT), or other display, which may detect when a user, such as user 20, is present at a computing device, such as mobile computing device 10. The presence-sensitive screen may include one or more cameras or other sensing devices for detecting the presence of the user. The presence sensitive screen may also detect one or more movements of the user, such as a gesture or other motion made by the user. In response to the presence of a user or an action or gesture made by the user, the computing device may take one or more actions.

One or more output devices 18 may also be included in mobile computing device 10. Output devices 18, in some examples, may be configured to provide output to a user using tactile, audio, and/or video output. One or more output devices 18 may also be input devices. Output device 18, in one example, includes a presence-sensitive screen, a speaker, a motor, and may utilize a sound card, a video graphics adapter card, and/or any other type of device for converting a signal into an appropriate form understandable to humans or machines. Additional examples of output device 18 include a touch sensitive screen, CRT monitor, an LCD, and/or any other type of device that can generate output to a user.

Mobile computing device 10, in some examples, may include one or more power sources 62, which may be rechargeable and provide power to mobile computing device 10. One or more power sources 62 may be internal to mobile computing device 10, such as a battery, or may be an external power source. In some examples where one or more power sources 62 are one or more batteries, the one or more batteries may be made from nickel-cadmium, lithium-ion, or other suitable material.

Mobile computing device 10 may include one or more operating systems 64. Operating systems 64, in some examples, may control the operation of components of mobile computing device 10. For example, operating systems 64, in one example, facilitates the interaction of facial recognition module 68 (which may further include confidence score module 70) with processors 50, network interfaces 54, storage devices 56, input devices 16, output devices 18, and power sources 62. If mobile computing device 10 includes more than one operating system, mobile computing device 10 may run one operating system and switch between others, and/or may virtualize one or more of operating systems 64.

As shown in FIG. 2, facial recognition module 68 may include confidence score module 70. Confidence score module 70 may include program instructions and/or data that mobile computing device 10 may execute. For example, confidence score module 70 may include instructions that cause facial recognition module 68 executing on mobile computing device 10 to perform one or more of the operations and actions described in the present disclosure.

In some examples, facial recognition module 68, along with template repository 24, and confidence score module 70, may be a part of operating system 64. In some examples, facial recognition module 68 may receive user input from one or more of input device 16 and/or camera 26. Facial recognition module 68 may, for example, receive captured templates 32 of FIG. 1 as part of performing facial recognition. Facial recognition module may comprise instructions that cause the one or more processors 50 to analyze the captured template. In some examples, confidence score module 70 may determine one or more confidence scores based on the captured templates 32. The confidence scores may include a face detection confidence score, one or more facial landmark detection confidence scores, and a geometric consistency score as described above. Based on the values of the one or more confidence scores, confidence score module 70 may determine an image quality score for captured templates 32. In some examples, the image quality score may comprise a weighted average of the face detection confidence score, one or more facial landmark detection confidence scores, and the geometric consistency score. Facial recognition module 68 may further determine an image quality for captured image 28. In some examples, facial recognition module 68 may classify captured image 28 as either good or poor quality. In an example, if any of the face detection confidence score, one or more facial landmark detection confidence scores, and the geometric consistency score fall below a certain threshold, then the image quality score may indicate that the captured image 28 is of poor quality. In some other examples, facial recognition module 68 may reject captured image 28 when captured image 28 is classified as a poor quality image.

In the event that a user attempts to authenticate with mobile computing device 10 via facial recognition, but is not authorized (e.g. due to the determination that captured image 28 is of low quality), facial recognition module 68 may deny user 20 access to the resources of mobile computing device 10, such as storage devices 56, input devices 16, network interfaces 54, output device 18, etc. Facial recognition module 68 may further discard captured image 28 and any captured templates 32. Facial recognition module 68 may also update GUI 22 to indicate a problem with captured templates 32 to user 20 of FIG. 1.

In some examples, if facial recognition module 68 determines that captured image 28 exhibit pitch, yaw, and/or roll, mobile computing device 10 may update GUI 22 of FIG. 1 with information that captured image 28 suffers from the one or more of yaw, pitch or roll. Facial recognition module 68 may determine that captured image 28 suffers from pitch, yaw and/or roll based on the values of the facial landmark detection confidence score, facial detection confidence score, and the geometric consistency score. As an example, if captured image 28 has a low geometric consistency score caused by the eyes of user 20 being too close together, facial recognition module 68 may determine that captured image 28 exhibits yaw.

In another example, if facial recognition module 68 determines that captured image 28 has a low geometric consistency score due to the eyes of user 20 being at an angle with respect to one another, facial recognition module 68 may determine that captured image 28 exhibits roll. Facial recognition module 68 may also determine that captured image 28 exhibits excessive pitch based in part on the geometric consistency score and the geometric relationship between the eyes and nose of user 20. Pitch, yaw, and roll detection are described below with respect to FIGS. 3-6.

In some examples, mobile computing device 10 may display captured image 28 to user 20 via GUI 22. In some examples, facial recognition module 68 may determine that captured image 28 suffers from pitch, and may reclassify captured image 28 as having poor quality. In some examples, facial recognition module 68 may also alert user 20 that image 28 is of low quality based on the values of a confidence score. In an example, GUI 22 may be updated to alert user 20 that facial recognition module 68 could not detect the face of user 20, his or her facial features, and/or that the distance between the features of user 20 was not consistent with that of a normal person's facial features. In an example, mobile computing device 10 may also output captured image 28 to user 20 via GUI 22.

If captured image 28 is of high quality, facial recognition module 68 may take different actions based on whether or not user 20 is engaged in the authentication phase or the enrollment phase. If user 20 is engaged in the enrollment phase, facial recognition module 68 may store captured templates 32 based on captured image 28 in template repository 24. If user 20 is engaged in the authentication phase, facial recognition module 68 may compare captured templates 32 with one or more templates from template repository 24 to determine whether captured templates 32 match one or more of the templates stored in template repository 24. If the features of captured templates 32 do match one or more of the templates of template repository 24, facial recognition module may grant user 20 access to the resources of mobile computing device 10. If the features of captured templates 32 do not match one or more images of template repository 24, facial recognition module 68 may deny user 20 access to the resources of mobile computing device 10, such as storage devices 56, input devices 16, network interfaces 54, output device 18, etc.

Responsive to denying user 20 access to the resources of mobile computing device 10 and/or alerting user 20 to issues with captured image 28, either due to captured templates 32 being of low quality or because captured templates 32 fail to match one or more of the images of template repository 24, facial recognition module 28 may allow user 20 to use camera 26 to acquire another image of user 20. If the newly acquired image is of high quality, the image may be used (e.g. for the purposes of enrollment) and any templates derived from the new image may be stored in template repository 24. If the image is of low quality, and the newly captured image does not match one or more of the templates of template repository 24 (e.g. in the authentication phase), user 20 may be denied access to the resources of mobile computing device 10, and may be denied additional attempts at authenticating to mobile computing device 10 via facial recognition. In some examples, after user 20 is denied access, GUI 22 may update to display an additional mechanism for authenticating with mobile computing device 10, which may include a pattern unlock screen, a numerical password screen, or any other method of authenticating with a computing device.

In various examples, facial recognition module 68, confidence score module 70, and/or template repository 24 may expose, propagate, and/or make available various application programming interfaces (APIs), and/or resources, such as templates, functions for computing various confidence and image quality scores, and for performing image comparisons, and other functions and resources that may be used in performing facial recognition and/or facial image quality assessment in accordance with techniques of this disclosure. The APIs and functions may be made available to end users, such as third party developers such that the developers may utilize the available propagated functions and the functionality of the facial recognition module 68, confidence score module 70, and/or template repository 24. The APIs and functions may be made available using Java, Python, C, C++, and/or any other functional or imperative programming languages, as well as native assembly languages and/or graphics programming languages.

FIGS. 3A-3I are conceptual diagrams illustrating a number of images of a user that may exhibit, pitch, roll, and yaw. Images of FIGS. 3A-3I (collectively referred to as "facial images") illustrate a face of a user, such as user 20 of FIG. 1. In the examples of FIGS. 3A-3I, a camera may capture an image similar to one of the facial images, and a computing device may generate a template based on the image and use the template to perform facial recognition techniques described herein (e.g., during the authentication or enrollment phases). In some examples, the camera may comprise camera 26 of FIG. 1 and the computing device may comprise mobile computing device 10 of FIG. 1.

As described with respect to FIG. 1, and illustrated with respect to FIGS. 3A-3I, the facial images captured by camera 26 may suffer from pitch, roll, and/or yaw. With regard to facial recognition, pitch, roll, and yaw may refer a rotation of a user's head about a particular axis. In general, roll may refer to a head that is rotated about its vertical axis, which is also referred to as rotating the head from side to side. Pitch may refer to a user moving his or her head up and down, as if the person were nodding. Yaw may refer to a user rotating his or her head side to side through a vertical axis and with the rotation being in line with a horizontal plane running one ear of the user to the other.

Facial image 3A is an example of where the head of user 20 is properly aligned. There is no rotation and the face of the user is squarely in alignment with the camera. Facial images 3B and 3C illustrate pitch. In facial image 3B, a user's face is tilted up and away from camera 26. In image 3C, the user's face is tilted down and toward camera 26. Facial images 3D and 3E illustrate roll. In image 3D, the face of user 20 is tilted to the left, and in image 3E, the image of user 20 is tilted to the right of camera 26. Images 3F-3I illustrate captured images, where the face of user 20 is yawed relative to camera 26. In image 3F, the head of user 20 is rotated to the left of camera 26, and in facial image 3G, the face of user 20 is also rotated to the left, but less so than in facial image 3F. In image 3H, the face of user 20 is rotated to the right, and in facial image 3I, the face of user 20 is rotated even further to the right than in image 106C.

Techniques of this disclosure are directed toward determining whether a captured image or template used for facial recognition purposes exhibits a large yaw or pitch, or roll (i.e. the captured image is off-axis). A captured image that exhibits a large pitch, yaw, and/or roll may be unsuitable for use with facial recognition. In some examples, a captured image that exhibits large yaw may also produce one or more low confidence scores when performing facial recognition.

Figure 4A:
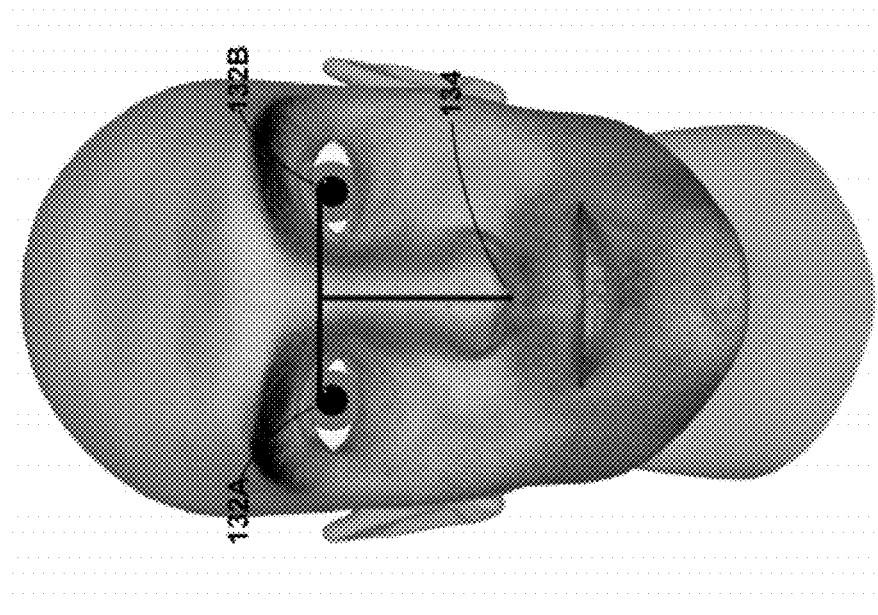
FIGS. 4A and 4B are conceptual diagrams illustrating two captured images of a user, one of which is aligned with a camera, and one of which is not.
Figure 4B:
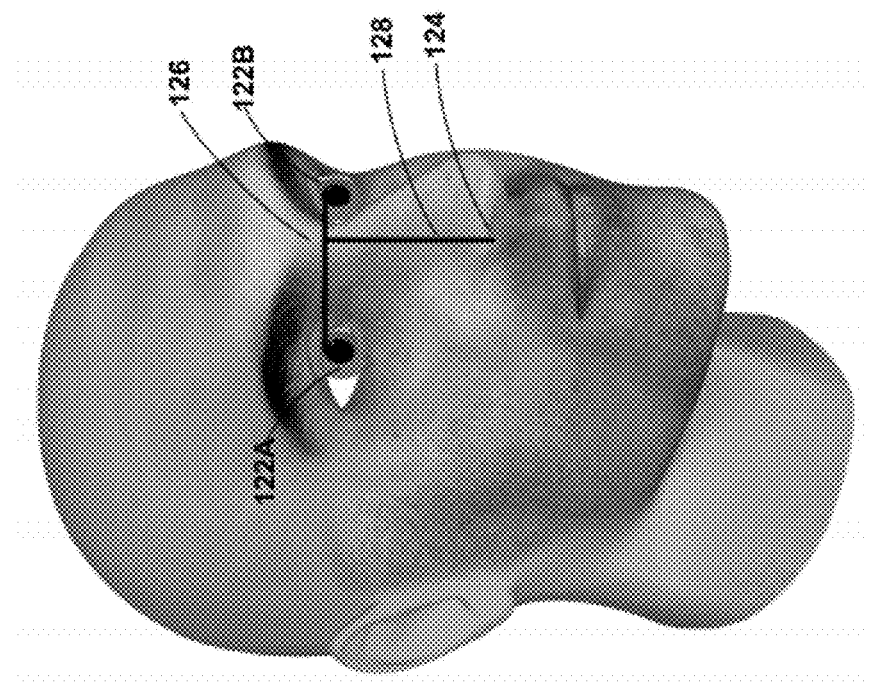

FIGS. 4A and 4B are conceptual diagrams illustrating two captured images of a user (referred to as "image 4A" and "image 4B"), one of which is aligned with a camera, and one of which is not. Images 4A and 4B may be of user 20 of FIG. 1. Images 4A and 4B are described in the context of FIGS. 1-2. In some examples, camera 26 of computing device 10 may capture images 4A and 4B. Image 4A exhibits significant yaw, while image 4B does not. Image 4A exhibits significant yaw because the head of user 20 is rotated to the right of camera 26 of FIG. 1, rather than being aligned with camera 26. Image 4B does not exhibit significant yaw and is aligned with camera 26.

Because Image 4A exhibits significant yaw, image 4A may be of low quality and therefore unsuitable for use with facial recognition. As described above, mobile computing device 10 may determine that image 4A is of low quality and reject it from being used during facial authentication. Similarly, image 4A may result in an unsuitable template for use during authentication.

To determine whether images 4A-4B are of suitable quality for facial authentication, facial recognition module 68 may analyze captured images 4A and 4B and produce templates based on captured images 4A and 4B. Facial recognition module 68 may base the determination of whether images 4A or 4B or templates associated with both of images 4A-4B are of low quality based on the values of one or more confidence scores, which confidence score module 70 may determine.

Confidence score module 70 may analyze a template to determine a facial detection confidence score. A facial detection confidence score may indicate the likelihood that a face of a person has been detected in a given template. In an example, the face detection confidence score value may be based on whether or not facial recognition module 68 is able to determine that a face is present in an image. In an example, image 4A may have a lower face detection confidence score than image 4B because image 4A exhibits significant yaw.

In another example, confidence score module 70 may determine a facial landmark detection confidence score. The facial detection landmark confidence score may indicate a confidence that various facial features have been detected in an image, as described above. In some examples, the facial features may include the pupils of the eyes and the base of the nose of a person. However, in images exhibiting significant yaw, facial recognition module 68 may be less able to detect the eyes and the base of the nose of a user. Because the eyes and base of the nose may be less detectable, an image exhibiting yaw may produce a lower facial landmark detection confidence score than an image that does not exhibit significant yaw.

Image 4A exhibits significant yaw. As a result, the eyes 122A and 122B of user 20 may not be as easily detected from the template derived from image 4A as eyes 132A and 132B of the template derived from image 4B. In another example, a base of a nose 124 of image 4A may not as easily be detected as a base of the nose 134 of image 4B. Because eyes 122 and nose 124 are difficult to detect, confidence score module 70 may produce a lower facial feature detection confidence score. In some examples, facial recognition module 68 may determine based at least in part on the low facial feature detection confidence score, that image 4A may exhibit significant yaw.

In another example, confidence score module 70 may determine a geometric consistency score. Confidence score module 70 may determine the geometric consistency score based on distance measurements taken between facial features of user 20. The facial features may include a base 124 of the nose, and eyes 122A and 122B of user 20. In some examples, confidence score module 70 may calculate a distance of a line segment 126 that connects the eyes 122A-122B in the image. Confidence score module 70 may also calculate a distance of a line segment 128 that connects the base 124 of the nose and line segment 126.

Based on a location of the point of intersection of the base of the nose and the line segment connecting the eyes of the user, confidence score module 70 may determine that image 4A exhibits significant yaw. As the distance between line segment 128 that connects the base of nose 124 to line segment 126 connecting eyes 122 moves further away from the midpoint of line segment 126, the geometric consistency score decreases. In an example, if the point of intersection between line segment 128 and line segment 126 is between two percentages, x and y of the length of the line connecting the eyes, confidence score module 70 may produce a geometric consistency score that indicates that image 4A is of high quality. Confidence score module 70 may further determine a lower geometric consistency score for image 4A as a yaw angle of the face of user 20 included in image 4A increases.

Based on one or more low confidence scores, facial recognition module 68 may determine that image 4A exhibits significant yaw. In some examples, the confidence scores may comprise a face detection confidence score, facial feature confidence detection score, and a geometric consistency score. Based on the determination that image 4A exhibits significant yaw, facial recognition module 4A may update GUI 22 to alert user 20 that image 4A exhibits significant yaw. Responsive to determining that image 4A exhibits significant yaw, mobile computing device 10 may allow user 20 to use camera 26 in order to capture another image of him or herself. By allowing user 20 to capture another image of him or herself, mobile computing device 10 may acquire an image that is of higher quality for the purposes of performing facial recognition.

In some examples, mobile computing device 10 may utilize signals in addition to confidence scores in order to determine that image 4A exhibits significant yaw. Although illustrated as being a single captured image 4A, in various examples, a captured image may comprise any image that exhibits significant yaw of any face of any user and/or person.

FIGS. 5A-5C are conceptual diagrams illustrating three captured images of a user, which may exhibit pitch. Each of the three captured images of a user, e.g. user 20, may be referred to as "image 5A," "image 5B," and "image 5C," respectively, and collectively referred to as "images 5." In some examples, mobile computing device 10 may determine that images 5B-5C exhibit excessive pitch, and may also determine that image 5A does not exhibit excessive pitch. Mobile computing device 10 may determine whether images 5 exhibit excessive pitch based on a geometric consistency score of each image. As noted above, the geometric consistency score is based upon a calculated distance of a line segment 160 that connects eyes 152A-152B in image 5A. Facial recognition module 68 may also examine the distance of a line segment 154 that connects the base of a nose 158 with the intersection of line segment 160 that connects each of eyes 152A-152B. If the line segment 154 connecting the point of intersection with the base of the nose 158 is too long or short relative to a reference length, or if the ratio of the nose line segment 154 and the eye line segment 160 is too large or too small, facial recognition module 68 may determine that image 5B or 5C exhibits excessive pitch.

In some examples, facial recognition module 68 may determine that image 5A does not exhibit excessive pitch. Facial recognition module may make this determination based on the ratio between line segment 154 and line segment 160. In images 5B and 5C, facial recognition module 68 may similarly determine the ratio between the two line segments 164 and 174 in image 5B, and line segments 180 and 174 in image 5C. In the case of image 5B, facial recognition module 68 may determine that the image 5B exhibits excessive pitch based on the ratio between the two line segments 180 and 17. The ratio that facial recognition module 68 calculates may be smaller in FIG. 5B than in FIG. 5A because of the shorter distance of segment 164 relative to line segment 174. In the example of image 5C, facial recognition module 68 may calculate the ratio between line segment 174 and line segment 180 of image 5C. Based on the calculated ratio, facial recognition module 68 may determine that image 5C exhibits excessive pitch. Facial recognition module 68 may make the determination that image 5C exhibits excessive pitch based on the determination that the ratio between line segments 174 and 180 is small, due to the length of line segment 174.

Figure 6C:
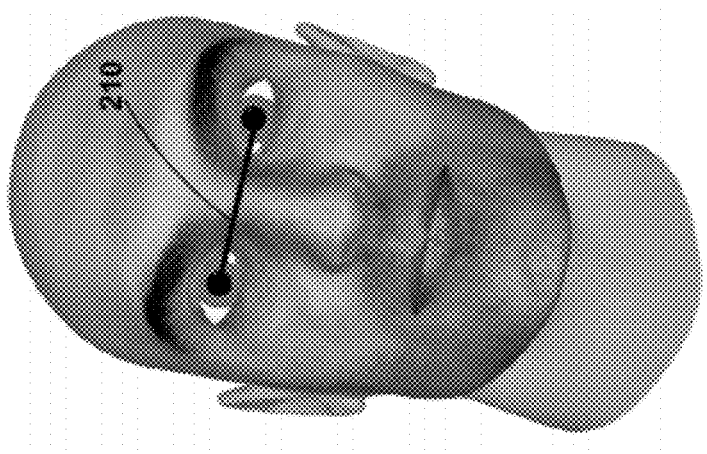
FIGS. 6A-6C are conceptual diagrams illustrating three captured images of a user, which may exhibit roll.
Figure 6B:
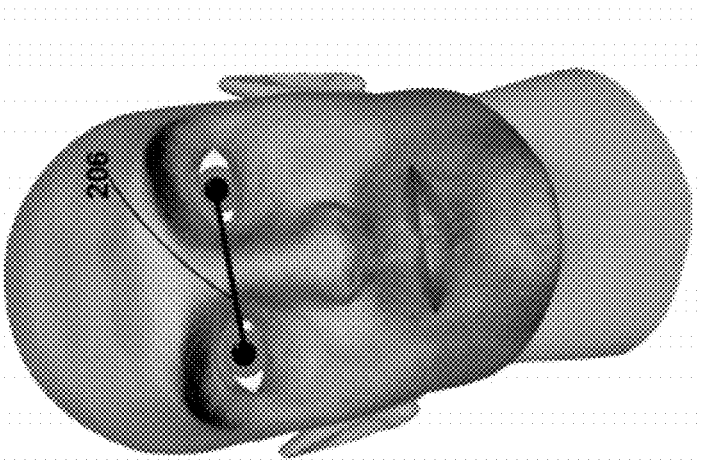
Figure 6A:
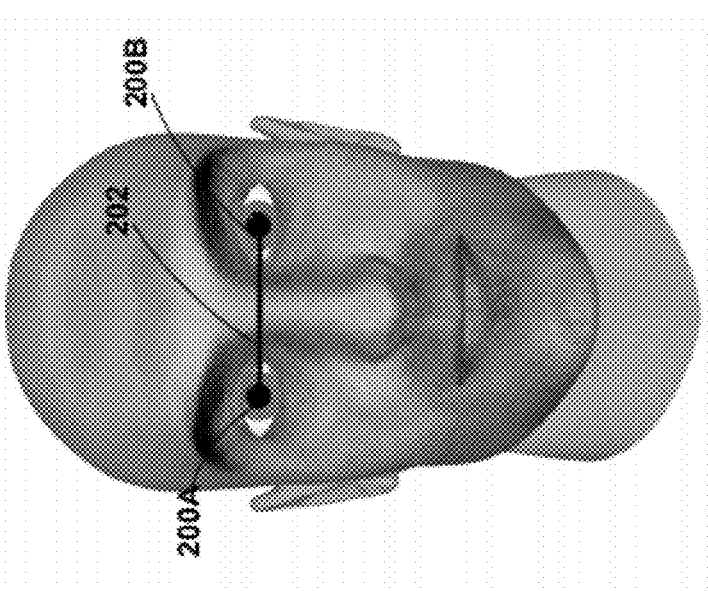

FIGS. 6A-6C are conceptual diagrams illustrating three captured images of a user, which may exhibit roll. FIGS. 6A-6C may each be referred to as "image 6A," "image 6B," and "image 6C," respectively, and collectively referred to as "images 6." Images 6 may be used to illustrate the process by which mobile computing device 10 determines whether an image, e.g. one of images 6, exhibits roll. Facial recognition module 68 may determine an angle of a line segment connecting the eyes of a user 20 in an image, e.g. the angle of line segment 202 of FIG. 6A connecting eyes 200A and 200B. Facial recognition module may determine whether the angle of line segment 202 exceeds a threshold angle relative to horizontal. If the angle of line segment 202, exceeds the threshold angle, facial recognition module 68 may classify the image 6A as a low quality image that is unsuitable for use in facial authentication In some examples, facial recognition module 68 may determine the angle of line segment 202. Facial recognition module 68 may further determine that line segment does not exceed the threshold angle and therefore that image 6A does not exhibit significant roll. In images 6B and 6C, facial recognition module 68 may similarly determine the angle of line segments 206 and 210 relative to horizontal. In the case of image 6B, facial recognition module may determine whether the determined angle of line segment 206 exceeds a threshold maximum angle. If the angle of line segment 206 is greater than the threshold maximum angle, facial recognition module 68 may determine that image 6B is of low quality at least because image 6B exhibits excessive roll and, therefore, determine that image 6B is unsuitable for use in facial authentication. Facial recognition module 68 may perform a similar process with respect to FIG. 6C. Specifically, facial recognition module 68 may determine the angle of line segment 210 in image 6C exceeds a threshold maximum angle, and, therefore, may classify image 6C as a low quality image that is unsuitable for use in facial authentication.

Figure 7:
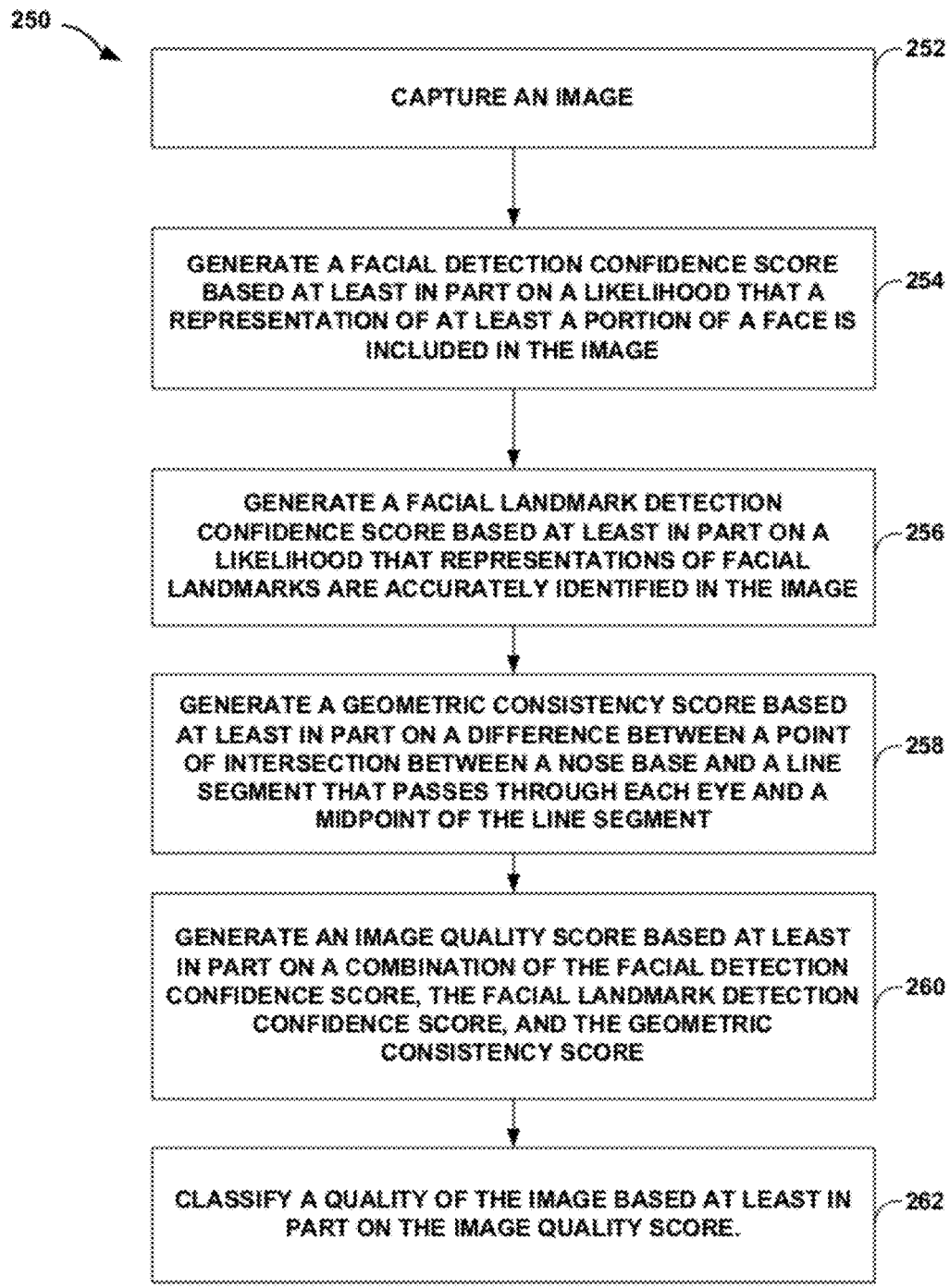
FIG. 7 is a flow chart illustrating an example process for performing quality assessment of a facial image, in accordance with one or more aspects of the present disclosure.

FIG. 7 is a flow chart illustrating an example process for performing quality assessment of a facial image, in accordance with one or more aspects of the present disclosure. Process 150 may be performed by any computing device described in this disclosure. For purposes of ease of illustration only, process 150 is describe herein with respect to mobile computing device 10 of FIGS. 1 and 2, and in the context of analysis processes described with respect to FIGS. 3A-3I, 4A-4B, 5A-5C, and 6A-6C.

Process 250 may begin when mobile computing device 10 captures an image, e.g. captured image 28. Based on captured image 28, computing device 10 may produce one or more templates, e.g. captured templates 32, using camera 26. (152).

Process 250 may further include confidence score module 70 generating a facial detection confidence score based at least in part on a likelihood that a representation of at least a portion of a face is included in captured image 28 (254). In some examples, the facial detection confidence score may indicate a lower amount of confidence as an absolute value of a yaw angle of the user's face included in the captured image increases.

Process 250 may further include confidence score module 70 of mobile computing device 10 generating a facial landmark detection confidence score based at least in part on a likelihood that representations of facial landmarks are accurately identified in captured image 28 (256). In some examples, the facial landmark detection confidence score may indicate a lower amount of confidence as the absolute value of the yaw angle of the face of user 20 included in the image increases. In some examples, the facial landmarks may comprise at least the nose base and each eye of a user, e.g. user 20.

Process 250 may further include confidence score module 70 of mobile computing device 10 generating a geometric consistency score based at least in part on a difference between a point of intersection between a nose base and a line segment that passes through each eye and a midpoint of the line segment of captured image 28 (258). In some examples, the geometric consistency score may indicate a lower amount of consistence as an absolute value of the yaw angle of the face of user 20 included in the image increases or that the representations of facial landmarks have not been located accurately. Process 250 may further include facial recognition module 68 of mobile computing device 10 generating an image quality score based at least in part on a combination of the facial detection confidence score, the facial landmark detection confidence score, and the geometric consistency score (260).

Process 250 may further include facial recognition module 68 of mobile computing device 10 classifying a quality of the captured image based in least in part on the image quality score (262). In some examples, process 250 may further include facial recognition module 68 of mobile computing device 10 rejecting the image when the image is classified as a poor quality image. And in some examples when the captured image is classified as a poor quality image, output devices 18 of mobile computing device 10 may output an indication that the image was classified as a poor quality image. In an example, mobile computing device 10 may output recommended actions to increase the quality of the image, when the captured image is classified as a poor quality image.

In some examples, the face may be a first face, and responsive to the captured image being classified as a good quality image, mobile computing device 10 may retrieve a template, e.g. one of reference templates 24, that includes at least a portion of a second face. Facial recognition module 68 may further align representations of first face with the second face based at least in part on the facial landmarks of the image and facial landmarks of the template. Facial recognition module 68 may further compare representations of the first face and the second face in order to determine if the representation of the first face matches the representation of the second face and authenticate the user based on the comparison. In a further example, a user may be authenticated and granted access to the resources of the mobile computing device when the representations of the first face and the second face are determined to match by facial recognition module 68. In another example, the user may be denied access to the resources of the mobile computing device when the representations of the first face and the second face are determined not to match by facial recognition module 68.

In an example where the representations of the first face and the second face are determined by mobile computing device 10 not to match, the user may be presented with an alternative authentication method to access the resources of mobile computing device 10. The alternative authentication method may comprise displaying a password screen or a gesture unlock screen or any other method of authenticating a user with a mobile device.

In various examples, wherein the image is classified as a good quality image, process 150 may further include facial recognition module 68 determining that an amount of pitch of the face in the image is greater than a threshold amount of pitch. Facial recognition module 68 may further reclassify the image as a poor quality image.

In an example, process 250 may further include at least one of the facial detection confidence score, the facial landmark detection confidence score, the geometric consistency confidence score, and the image quality score being propagated by mobile computing device 10 via an application programming interface (API). In another example, process 250 may further include mobile computing device 10 outputting the image. In a further example, facial recognition module 68 may cause mobile computing device 10 to output indications of the location of each eye and the nose base of the image.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
capturing, by a camera of a mobile computing device, an image;
generating, by the mobile computing device, a facial detection confidence score based at least in part on a likelihood that a representation of at least a portion of a face is included in the image;
generating, by the mobile computing device, a facial landmark detection confidence score based at least in part on a likelihood that representations of facial landmarks are accurately identified in the image;
generating, by the mobile computing device, a geometric consistency score based at least in part on a difference between a point of intersection between a nose base and a line segment that passes through each eye and a midpoint of the line segment in the image;
generating, by the mobile computing device, an image quality score based at least in part on a combination of the facial detection confidence score, the facial landmark detection confidence score, and the geometric consistency score; and
classifying, by the mobile computing device, a quality of the image based at least in part on the image quality score.

2. The method of claim 1, wherein the facial detection confidence score indicates a lower amount of confidence as an absolute value of a yaw angle of the user's face included in the image increases.

3. The method of claim 1, wherein the facial landmark detection confidence score indicates a lower amount of confidence as an absolute value of a yaw angle of the user's face included in the image increases.

4. The method of claim 1, wherein the facial landmarks comprise at least the nose base and each eye.

5. The method of claim 1, wherein the geometric consistency score indicates a lower amount of consistence as a yaw angle of the user's face included in the image increases or that the representations of facial landmarks have not been located accurately.

6. The method of claim 1, further comprising:
rejecting the image when the image is classified as a poor quality image.

7. The method of claim 6, further comprising:
outputting, by the mobile computing device, an indication that the image was classified as a poor quality image.

8. The method of claim 6, further comprising:
outputting, by the mobile computing device, recommended actions to increase the quality of the image.

9. The method of claim 1, wherein the face is a first face, the method further comprising:
responsive to the image being classified as a good quality image:
retrieving, by the mobile computing device, a template that includes at least a portion of a second face;
aligning representations of the first face with the second face based at least in part on the facial landmarks of the image and facial landmarks of the template;
comparing the representations of the first face and the second face in order to determine if the representation of the first face matches the representation of the second face; and
authenticating the user based on the comparison.

10. The method of claim 9, wherein the method further comprises:
authenticating the user and granting the user access to the resources of the mobile computing device when the representation of the first face and the representation of the second face are determined to match.

11. The method of claim 10, wherein the method further comprises:
denying the user access to the resources of the mobile computing device when the representations of the first face and the second face are determined not to match.

12. The method of claim 10, wherein the method further comprises:
presenting the user with an alternative authentication method to access the resources of the mobile computing device when the representations of the first face and the second face are determined not to match.

13. The method of claim 1, further comprising:
storing, by the computing device, the image as a template when the image is classified as a good quality image.

14. The method of claim 1, wherein the image is classified as a good quality image, the method further comprising:
determining that an amount of pitch of the face in the image is greater than a threshold amount of pitch; and
reclassifying the image as a poor quality image.

15. The method of claim 1, wherein at least one of the facial detection confidence score, the facial landmark detection confidence score, the geometric consistency score, and the image quality score are propagated using an application programming interface (API).

16. The method of claim 1, further comprising:
outputting, by the mobile computing device, the image.

17. The method of claim 16, further comprising:
outputting, by the mobile computing device, indications of locations of each eye and the nose base of the image.

18. The method of claim 1, wherein the image is classified as a good quality image, the method further comprising:
determining that an absolute value amount of yaw of the face in the image is greater than a threshold amount of yaw; and
reclassifying the image as a poor quality image.

19. A mobile computing device, comprising:
at least one camera configured to capture an image; and
at least one processor configured to:
generate a facial detection confidence score based at least in part on a likelihood that a representation of at least a portion of a face is included in the image;
generate a facial landmark detection confidence score based at least in part on a likelihood that representations of facial landmarks are accurately identified in the image;
generate a geometric consistency score based at least in part on a difference between a point of intersection between a nose base and a line segment that passes through each eye and a midpoint of the line segment in the image;
generate an image quality score based at least in part on a combination of the facial detection confidence score, the facial landmark detection confidence score, and the geometric consistency score; and
classify a quality of the image based at least in part on the image quality score.

20. A tangible computer-readable storage medium comprising instructions for causing at least one processor of a mobile computing device to perform operations comprising:
capturing, with a camera of the mobile computing device, an image;
generating a facial detection confidence score based at least in part on a likelihood that a representation of at least a portion of a face is included in the image;
generating a facial landmark detection confidence score based at least in part on a likelihood that representations of facial landmarks are accurately identified in the image;
generating a geometric consistency score based at least in part on a difference between a point of intersection between a nose base and a line segment that passes through each eye and a midpoint of the line segment in the image;
generating an image quality score based at least in part on a combination of the facial detection confidence score, the facial landmark detection confidence score, and the geometric consistency score; and
classifying a quality of the image based at least in part on the image quality score.

* * * * *